Dec. 16, 1924.
W. WALKER
EDUCATIONAL DEVICE
Filed June 12, 1922
1,519,426
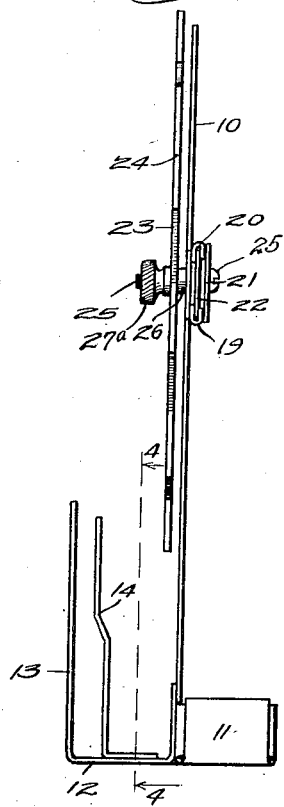
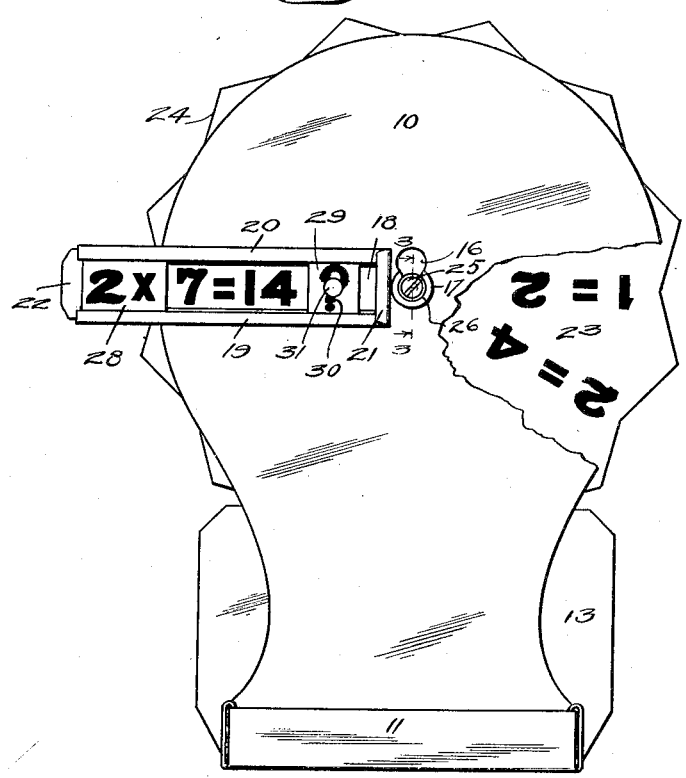
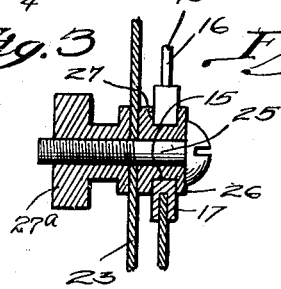
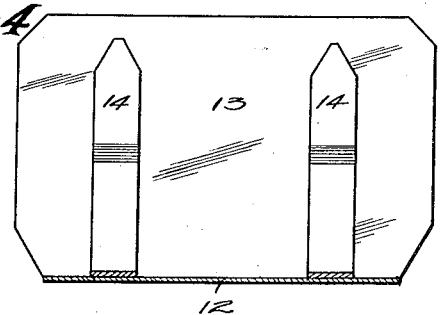
Inventor
William Walker
By Bair & Freeman
Attys
Witness
Lynn Latta Patented Dec. 16, 1924.

1,519,426

UNITED STATES PATENT OFFICE.

WILLIAM WALKER, OF ROYAL, IOWA.

EDUCATIONAL DEVICE.

Application filed June 12, 1922. Serial No. 567,559.

*To all whom it may concern:*

Be it known that I, WILLIAM WALKER, a citizen of the United States, and a resident of Royal, in the county of Clay and State of Iowa, have invented a certain new and useful Educational Device, of which the following is a specification.

The object of my invention is to provide a device of very simple, durable and inexpensive construction for teaching the multiplication tables and other subjects matter in a convenient and fascinating way.

My invention consists in the peculiar and novel features of structure of the device.

With this and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 shows a front elevation of an educational device embodying my invention.

Figure 2 shows a side elevation of the same.

Figure 3 shows a detailed, sectional view taken on the line 3—3 of Figure 1; and Figure 4 shows a detailed, sectional view taken on the line 4—4 of Figure 2.

The body of my improved educational device is preferably made of sheet metal, so that it will not easily be injured, and so that it may be of substantial permanent character.

My device consists of a plate or the like, indicated in the accompanying drawings by the reference character 10, which is longer than it is wide, and has its periphery at its upper edge in the form of a portion of a circle.

At the lower part of the plate 10 and projecting forwardly therefrom is a receptacle 11. Extending rearwardly from the lower part of the plate 10 is a bottom member 12 at the rear edge of which is an upwardly extending wall member 13 spaced from the plate 10.

Mounted on the bottom member 12 are one or more upwardly extending spring members 14, so arranged that the discs hereinafter mentioned or cards or the like may be placed between the clips 14 and the back member 13.

It will be seen that the receptacle 11 projecting forwardly from the member 10 and the bottom 12 projecting rearwardly therefrom afford supporting and receiving means for the sliding strips hereinafter referred to and the discs hereinafter referred to, and also form a convenient broad base or support for the device.

The plate 10 has a hole 15 arranged at the center of the circle of which the upper periphery of the plate 10 is a part of the circumference, and the hole 15 has an upwardly extending, enlarged portion 16, the entire opening having substantially the form of an ordinary keyhole.

The plate 10 around the lower part of the hole 15 may be provided with suitable reinforcement 17, as illustrated for instance in Figure 3.

Located laterally with relation to the hole 15, the plate 10 is provided with a horizontally extending slot 18. In front of the plate 10 and adjacent to the edges of the slot 18, I provide a guide frame, consisting of channel-shaped members 19, 20 and 21. The members 19 and 20 project laterally beyond the plate 10 and their projecting portions are connected by a plate or strip 22.

For use with my improved device, I provide a plurality of discs or the like 23, the peripheries of which are arranged with alternate notches and projections in sawtooth fashion, as at 24.

The projections extend slightly beyond the upper periphery of the plate 10, as illustrated in Figures 1 and 2.

For supporting the disc upon the plate 10, I provide a screw bolt 25. On the screw bolt 25 next to the head thereof is a small sleeve 26, having in its periphery an annular groove 27. The discs 23 are provided with central holes to receive the bolt 25, so that the discs may rest adjacent to the sleeve 26.

A nut 27ᵃ is screwed on the outer end of the screw bolt 25.

When the disc has been mounted on the bolt 25, a portion of the sleeve 26 is inserted through the enlarged portion 16 of the hole 15 and the disc is allowed to drop downwardly until the groove 27 receives the reinforcing 17, as shown in Figure 3.

The disc is thus mounted for rotation upon the plate 10.

The faces of the discs 23 carry suitable characters for the purpose for which they are designed. For the sake of illustration, I shall explain my device as used for teaching the multiplication table.

It is, of course, obvious that the different characters may be placed on the opposite faces of each disc, so as to get a maximum of value and utility from each disc.

In the particular illustration here shown, I have illustrated the discs as carrying parts of the multiplication table. Arranged in radial lines around the disc 23 are the multiplicand and result for use in multiplying by two. These various set of figures are so arranged that they may successively be brought to position opposite the opening 18.

I use small strips 28, having characters thereon. In the illustration shown, I have shown the strip 28 with the characters "2×" thereon. This strip 28 is slipped into the guide channels 19 and 20, as shown in Figure 1, in the portions of those channels, which project from the plate 10.

It will thus be seen that in successive order the pupil will have before him "2×1=2," "2×2=4" and so on.

Mounted in the guide channels 19 and 20 is a plate or the like 29, which may be blank or may have thereon an interrogatory character 30, as shown in Figure 1. A handle or the like 31 projects from the plate 29 for convenience in sliding it in the guides.

If it is desired, the plate 29 may be moved to such positions as to cover the results of the various multiplication calculations.

Thus in the illustration shown in the drawings, I have shown the disc 23 in such position that it shows opposite the slot or opening 18 the characters "7=14". If it is desired, the result "14" could be covered by the plate 29, or if it is desired the multiplicand may be covered by the plate 29, thus using the device for teaching division.

It will, of course, be understood that a great variety of subject matter may be printed on the plates 28 and 29 and on the discs 23 for teaching various subjects.

The plates 28 which are not in use, may be kept in the receptacle 11 and the discs which are not in use may be kept between the back 13 and the member 14.

The discs are preferably made of paper, so that they have some resiliency, but may be made of metal. Different discs 23 may be mounted on the plate 10 by grasping the nut 27ª, lifting the installed disc 23 and the bolt 25 until the sleeve 26 reaches the enlarged portion 16 of the opening 15 and can be withdrawn therefrom. By removing the nut 27ª, the installed disc 23 may be removed and another inserted in its place and then mounted on the plate 10.

Numerous changes might be made in the construction and arrangement of the various parts of my improved educational device without departing from the real spirit and purpose of my invention, and it is my intention to cover by my claims, any modified forms of structure or use of mechanical equivalents, which may be reasonably included within their scope.

I claim as my invention:

1. An educational device comprising an upright member, a disc having a projecting shaft detachably supported on said upright member and having educational matter on its face, said upright member having a sight opening provided with guides adjacent thereto and projecting therebeyond.

2. An educational device comprising an upright member, receiving devices at the lower edge thereof projecting respectively forwardly and rearwardly therefrom and forming a support for said upright member, said upright member having a horizontal sight opening therein, guide devices adjacent to said sight opening and projecting beyond said upright member, a plate received in said guide devices in the projecting portions thereof, having educational characters on its face, a disc rotatably mounted on said plate behind the plate, having educational characters on its face adapted to appear through said sight opening when the disc is rotated, said upright member having an opening therein of key-hole shape, a screw bolt having an externally grooved sleeve thereon, and means for holding said disc on said screw bolt, said sleeve being mounted in said key-hole slot.

Des Moines, Iowa, May 5, 1922.

WILLIAM WALKER.